(12) United States Patent
Fujiwara

(10) Patent No.: US 9,563,981 B2
(45) Date of Patent: Feb. 7, 2017

(54) INFORMATION PROCESSING APPARATUS, INFORMATION PROCESSING METHOD, AND PROGRAM

(71) Applicant: SONY CORPORATION, Tokyo (JP)

(72) Inventor: Tatsuo Fujiwara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 112 days.

(21) Appl. No.: 14/551,571

(22) Filed: Nov. 24, 2014

(65) Prior Publication Data

US 2015/0161762 A1 Jun. 11, 2015

(30) Foreign Application Priority Data

Dec. 10, 2013 (JP) .................................. 2013-255049

(51) Int. Cl.
*G09G 5/00* (2006.01)
*G06T 19/00* (2011.01)
*G06T 11/60* (2006.01)

(52) U.S. Cl.
CPC ............. *G06T 19/006* (2013.01); *G06T 11/60* (2013.01)

(58) Field of Classification Search
None
See application file for complete search history.

(56) References Cited

U.S. PATENT DOCUMENTS

| 2015/0109337 A1* | 4/2015 | Hofmann | G06T 7/0002 345/633 |
| 2015/0221133 A1* | 8/2015 | Groten | G06K 9/00671 345/633 |
| 2015/0235373 A1* | 8/2015 | Kato | G06T 7/0075 348/51 |

FOREIGN PATENT DOCUMENTS

JP 2011-252879 A 12/2011

* cited by examiner

*Primary Examiner* — Xiao Wu
*Assistant Examiner* — Mohammad H Akhavannik
(74) *Attorney, Agent, or Firm* — Chip Law Group

(57) ABSTRACT

An information processing apparatus includes an imaging unit, a control unit, and an output unit. The control unit is configured to detect at least one candidate area for overlaid display of a content, from an image imaged by the imaging unit. The control unit is further configured to detect as an overlaid display area, out of the at least one candidate area, an area where a change in undulation of luminance distribution is equal to or less than a first threshold value. The control unit is further configured to generate the content to be arranged virtually in a visually recognizable manner on the overlaid display area, to be recognized by a user. The output unit is configured to output the generated content overlaid on the overlaid display area.

11 Claims, 4 Drawing Sheets

INFORMATION PROCESSING APPARATUS, INFORMATION PROCESSING METHOD, AND PROGRAM

CROSS REFERENCE TO RELATED APPLICATIONS

This application claims the benefit of Japanese Priority Patent Application JP 2013-255049 filed Dec. 10, 2013, the entire contents of which are incorporated herein by reference.

BACKGROUND

The present disclosure relates to an information processing apparatus capable of displaying a content that is overlaid on an input image, and an information processing method and a program for the information processing apparatus.

Recently, MR (Mixed Reality), which is an environment where real and virtual worlds are fused together, has been studied actively. Among such studies, AR (Augmented Reality), which displays a virtual-world content overlaid on the real world to enhance one's perception of reality, has attracted a lot of attention.

The AR has already been realized by, for example, smartphones, and wearable devices such as HMD (Head Mount Display) type or see-through eyeglasses type devices. For example, Japanese Patent Application Laid-open No. 2011-252879 discloses the technology of a mobile terminal apparatus which may be held by a visitor walking around an archaeological site. The mobile terminal apparatus may display information of the items exhibited in the site, by overlaying such information upon the images of the site being photographed by a camera.

SUMMARY

However, the technology of Japanese Patent Application Laid-open No. 2011-252879 in the past might have a problem that the visibility of the virtual content may be impaired, for example, when texture components are strong in an overlaid display area where the virtual content is displayed. In view of the circumstances as described above, there is a demand for providing an information processing apparatus, an information processing method and a program that are capable of preventing the loss of visibility when displaying overlaid images of AR.

According to an embodiment of the present disclosure, there is provided an information processing apparatus including an imaging unit, a control unit, and an output unit.

The control unit is configured to detect at least one candidate area for overlaid display of a content, from an image imaged by the imaging unit. The control unit is further configured to detect as an overlaid display area, out of the at least one candidate area, an area where a change in undulation of luminance distribution is equal to or less than a first threshold value. The control unit is further configured to generate the content to be arranged virtually in a visually recognizable manner on the overlaid display area, to be recognized by a user.

The output unit is configured to output the generated content overlaid on the overlaid display area. This allows the information processing apparatus to detect an area where a change in undulation of luminance distribution is small, that is, an area where texture components are weak; and to display the content overlaid on the detected area. This can prevent the loss of visibility due to the display of overlaid images on the areas where texture components are strong.

The control unit may detect as the overlaid display area, out of the at least one candidate area, an area where a change in undulation of three-dimensional geometry is equal to or less than a second threshold. This allows the information processing apparatus to detect a relatively flat area as the overlaid display area, and display the content with high visibility in a shape following the three-dimensional geometry of the real world.

The control unit may detect whether or not each of the at least one candidate area is a moving object area, and may exclude the moving object area from the overlaid display area. This improves not only visibility but also safety, by preventing the information processing apparatus from displaying the content on the moving object area.

The information processing apparatus may further include a sensor which is configured to detect an attitude of the information processing apparatus. In this case, the control unit may detect a change in the attitude that has been detected by the sensor, and may detect the moving object area by subtracting the change in the attitude from the input image. This allows the information processing apparatus to detect the moving object area in the image with high accuracy even during movement of the apparatus, by canceling the effect of the change in its attitude.

The control unit may detect presence or absence of the moving object area by: calculating first and second depth distributions, respectively from consecutive first and second images out of the input image; calculating a third depth distribution by reflecting on the first depth distribution the change in the attitude being detected with respect to a time interval between the first and second images; and detecting presence or absence of any difference between the second and third depth distributions. This allows the information processing apparatus to detect the moving object area in the image with high accuracy even during movement of the apparatus, by comparing the depth distributions between frames after off-setting an amount of the change in the attitude.

The information processing apparatus may further include a sensor to detect an attitude of the information processing apparatus. In this case, the control unit may determine whether or not the information processing apparatus is at rest, and if the information processing apparatus is at rest, detect the moving object area by extracting the difference between the consequent images having been input. This enables overlay-display processing of the information processing apparatus only in a rest state. As a result, the detection of the moving object area can be simplified and the processing load can be reduced.

The output unit may output the generated content in a semi-transparent state overlaid on the overlaid display area. In this case, the control unit may be configured to, if the candidate area with the change in undulation of luminance distribution being equal to or less than the first threshold value is not detected, control the output unit to overlay the generated content at a decreased transparency that is lower than a transparency of the semi-transparent state. This can prevent decrease in visibility and safety of the information processing apparatus, by making the transparency of the content lower, if no area with weak texture is found.

The control unit may be configured to, if the candidate area with the change in undulation of luminance distribution being equal to or less than the first threshold value is not detected, control the output unit to display the content on an area other than the candidate area, with an indication of an association between the content and a candidate area where the change in undulation of luminance distribution is greater than the first threshold. This may allow the information processing apparatus to display the content in an area other than the candidate area with, for example, a lead line outgoing from the candidate area. Thus, the information processing apparatus may let a user understand the association between the area and the content, even in cases where no area with weak texture is found.

The control unit may detect a moving object area out of the at least one candidate area, as the overlaid display area. This allows the information processing apparatus to attract the user's interest by using a moving object as the overlaid display area.

According to another embodiment of the present disclosure, there is provided an information processing method. The method includes: detecting at least one candidate area for overlaid display of a content, from an image imaged by the imaging unit; detecting as an overlaid display area, out of the at least one candidate area, an area where a change in undulation of luminance distribution is equal to or less than a first threshold value; generating the content to be arranged virtually in a visually recognizable manner on the overlaid display area, to be recognized by a user; and outputting the generated content overlaid on the overlaid display area.

According to still another embodiment of the present disclosure, there is provided a program causing an information processing apparatus to execute: detecting at least one candidate area for overlaid display of a content, from an image imaged by the imaging unit; detecting as an overlaid display area, out of the at least one candidate area, an area where a change in undulation of luminance distribution is equal to or less than a first threshold value; generating the content to be arranged virtually in a visually recognizable manner on the overlaid display area, to be recognized by a user; and outputting the generated content overlaid on the overlaid display area.

As described above, according to the present disclosure, it is possible to prevent the loss of visibility when displaying overlaid images of AR. However, the scope of the present disclosure is not limited by this effect.

These and other objects, features and advantages of the present disclosure will become more apparent in light of the following detailed description of best mode embodiment thereof, as illustrated in the accompanying drawings.

DETAILED DESCRIPTION OF EMBODIMENTS

Hereinafter, an embodiment of the present disclosure will be described with reference to the drawings.

[System Overview]

Figure 1:
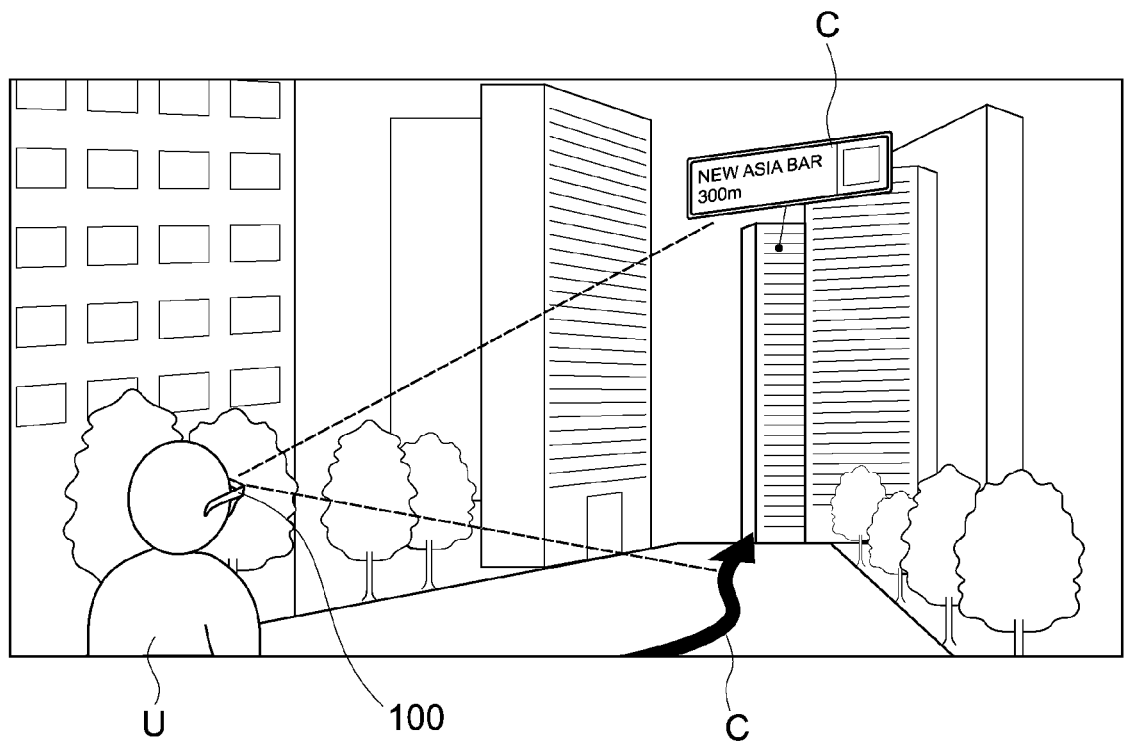
FIG. 1 shows an overview of a system using a HMD according to an embodiment of the present disclosure.

FIG. 1 shows an overview of a system according to an embodiment of the present disclosure.

As shown in FIG. 1, in this embodiment, a user wears a see-through eyeglasses type HMD (Head Mount Display) 100 on the head and realizes an AR environment. The user is able to visually recognize the real-world environment through a lens or lenses (display unit) of the HMD 100, while visually recognizing contents C being displayed virtually overlaid on objects of the real-world environment such as roads, buildings and signs.

For example, as shown in FIG. 1, in the user's view, a line navigating the user to the user's destination may be shown on the road; and information of restaurants or bars existing in buildings may be shown on the buildings.

According to this embodiment, when the overlay display by the AR system is performed, the HMD 100 is able to overlay-display the content, while avoiding displaying on an area with strong texture (with a large change in undulation of luminance distribution) or the like, in consideration of the visibility by the user.

[Hardware Configuration of HMD]

Figure 2:
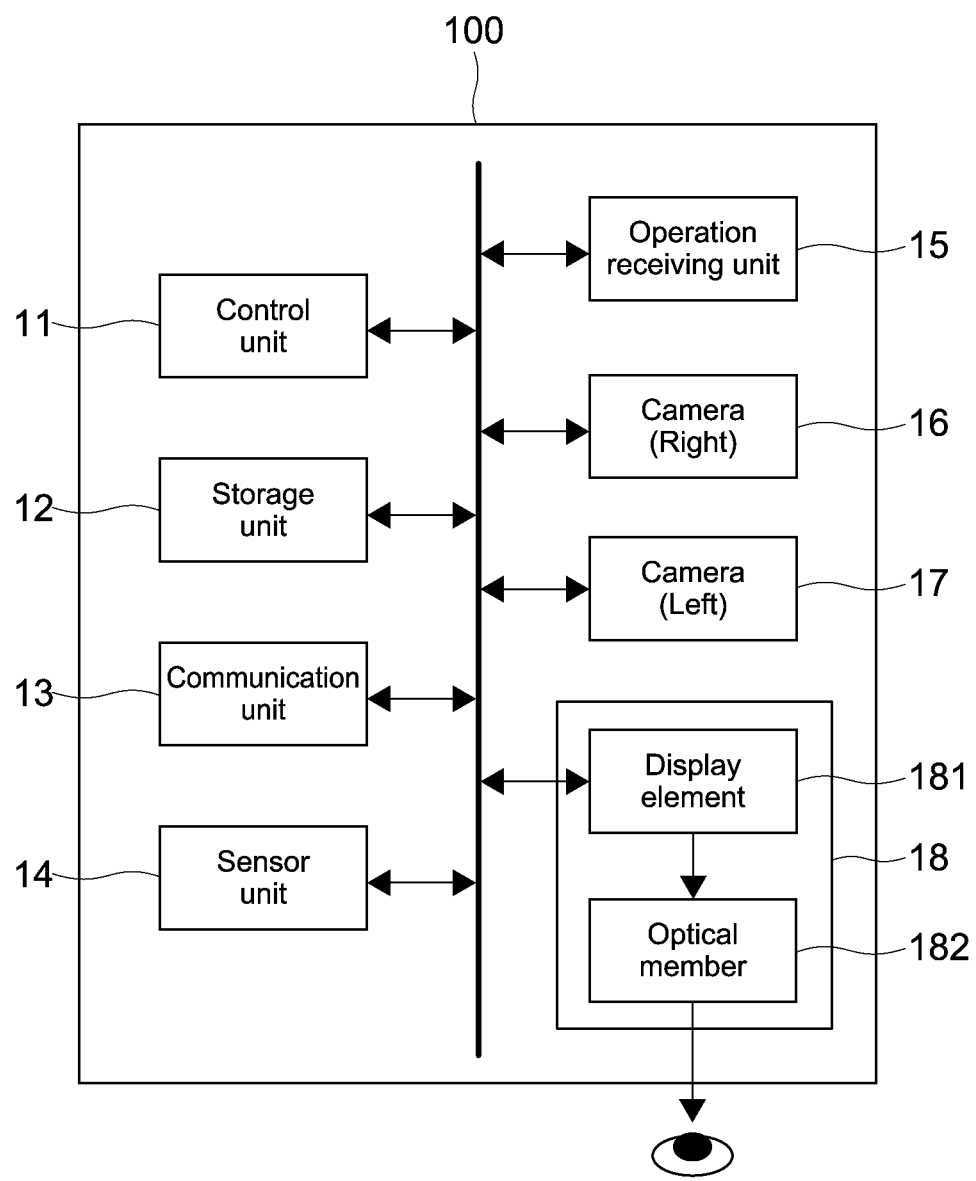
FIG. 2 is a block diagram showing hardware configuration of the HMD.

FIG. 2 is a block diagram showing hardware configuration of the HMD 100. As shown in FIG. 2, the HMD 100 has a control unit 11, a storage unit 12, a communication unit 13, a sensor unit 14, an operation receiving unit 15, a right-camera 16, a left-camera 17 and a display unit 18.

The control unit 11 is made up of, for example, CPU (Central Processing Unit), GPU (Graphics Processing Unit) and the like. In execution of content overlay-display processing and the like, the control unit 11 performs overall control for entire blocks of the HMD 100 while performing various computation processes.

The storage unit 12 is, for example, a nonvolatile memory such as a flash memory (SSD; Solid State Drive) and other solid-state memories. The storage unit 12 stores an OS, various applications and various data. Specifically, in this embodiment, the storage unit 12 stores, for example, the contents (e.g., advertising texts and images, etc.) to be displayed overlaid.

The communication unit 13 is, for example, a wireless communication module, supporting a wireless LAN (Local Area Network) such as Wi-Fi (Wireless Fidelity), supporting Bluetooth (registered trademark) standards, or the like. For example, the communication unit 13 may be capable of communicating with a device such as a smartphone that the user carries. In addition, the communication unit 13 is capable of receiving data from the Internet, via the user's portable device such as the smartphone or directly, the data being necessary for overlay display of the content, map information, and the like.

The sensor unit 14 is made up of various sensors such as a gyro sensor, an acceleration sensor and a geomagnetic sensor. The sensor unit 14 may detect an attitude of the HMD 100 (the user), position, direction, and the like, to perform processing to display a virtual three-dimensional object O.

The operation receiving unit 15 is made up of, for example, a touch-panel, buttons, switches, and the like. The operation receiving unit 15 receives various operations by the user.

The right and left cameras 16 and 17 may be, for example, respectively mounted to right and left frames of the HMD 100, and may work as a pair of stereo cameras that recognizes the real-world environment (positions, three-dimensional shapes and depths (Depth Map) of objects) in front of the user, based on the disparity between the images taken by the two cameras.

The display unit 18 is made up as a transmissive display having a display element 181 and an optical member 182.

The display unit 18 may form an image of a content by using, for example, the display element 181 which is housed in a frame part of the HMD 100, and may guide the image light into the optical member 182 to output the image light to the user's eyes, which presents the image of the content to the user. The image of the content may be either two-dimensional or three-dimensional.

The display element 181 is made up of, for example, a LCD (Liquid Crystal Display). The optical member 182 may have a deflecting element (holographic diffraction grating) and a light guide plate which serves as a display surface. The deflecting element diffracts and reflects the light having the specific wavelengths corresponding to each color of RGB colors. The light would be totally reflected inside the light guide plate, and thus the image can be output to the user's eyes.

[Operation of HMD]

Next, a description will be given on the operation of the HMD 100 configured as described above. In the following description, the control unit 11 of the HMD 100 will be described as the main subject that performs the operation. Such operation may be performed in co-operation with other hardware and software which may be executed under the control of the control unit 11.

[Overlay-Display Processing]

Figure 3:
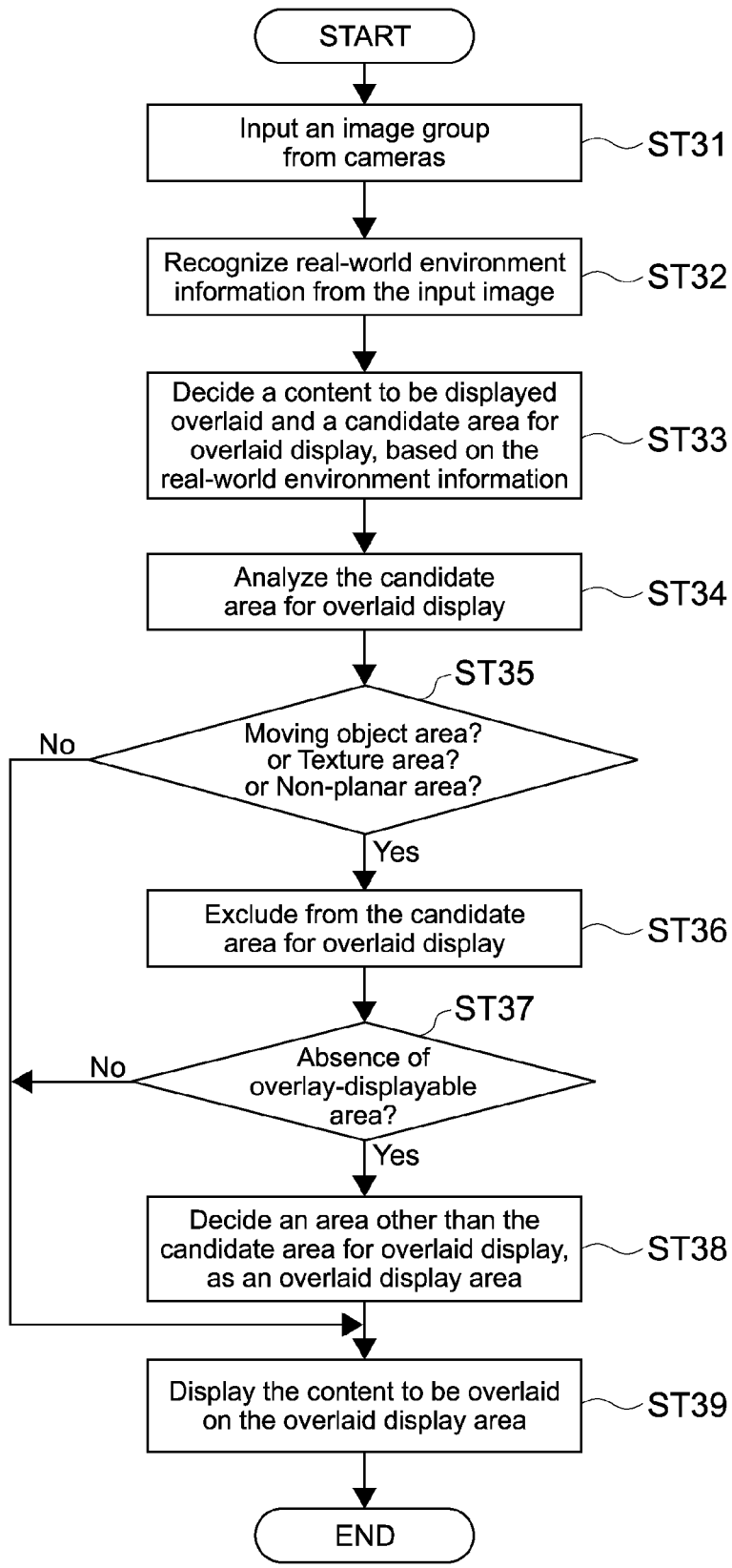
FIG. 3 is a flowchart showing the flow of content overlay-display processing of the HMD.

FIG. 3 is a flowchart showing the flow of content overlay-display processing of the HMD 100. As shown in FIG. 3, first, to the control unit 11 of the HMD 100, an image group imaged by the right and left cameras 16 and (Step 31). Alternatively, the image group may be input from one camera.

Then, the control unit 11 recognizes information of the real-world environment where the user is, from the input image (Step 32). Specifically, the control unit 11 estimates and calculates the attitudes of the cameras 16 and 17 based on each input image. The attitudes of the cameras 16 and 17 are made by the positions and the angles in the three-dimensional world (directions to which the cameras 16 and 17 are facing). These may be calculated based on, for example, a result of matching pixel values or feature points between images, information of the sensor unit 14 (an acceleration sensor, an angular velocity (gyro) sensor, and a geomagnetic sensor), or the like.

Further, the control unit 11 may calculate depth information (Depth Map) in addition to the above. The depth information may be calculated by matching a plurality of images, such as a plurality of frames in time series, or a pair of images in a stereo image input from the cameras 16 and 17, or the like. Moreover, it is also possible to apply techniques using other sensors such as irradiation of IR patterns with an IR sensor. In addition, the control unit 11 may also be capable of recognizing the real-world environment by identifying objects from the image, or by using GPS information.

Then, in response to the user's request, the context, or the like, the control unit 11 decides a content such as advertisement and various information associated with map information, to be displayed overlaid; and decides a candidate area for its overlaid display, based on the real-world environment information that has been recognized (Step 33).

In selecting the candidate area for overlaid display, the control unit 11 may detect the user's eye gaze as well. The user's eye gaze may be detected by the right and left cameras 16 and 17 or, for example, by a special sensor such as a near-infrared LED (Light Emitting Diode) sensor capable of detecting a user's pupil, a combination of this sensor and the cameras, or other techniques by optical, physical or electrical means. Then, the control unit 11 analyzes the image of the candidate area for overlaid display and determines whether or not the candidate area is suitable for the overlaid display area (Step 34).

Specifically, the control unit 11 determines whether or not the candidate area for overlaid display is any of a moving object area, a texture area and a non-planar area (Step 35); and if the candidate area for overlaid display meets any of these three conditions, the control unit 11 may exclude the area from the candidate (Step 36).

Examples of the moving object areas include the areas corresponding to crowds and passing cars. The control unit 11 is able to detect whether or not the imaged object contains a moving object, after subtracting the effect of change in the attitudes of the cameras 16 and 17. The moving object area is excluded from the candidate area for overlaid display because displaying something overlaid on the moving object area may lead to problems in safety as well as in visibility. The detail of a method of detection of the moving object area will be described later.

The texture area is an area where a change in undulation of luminance distribution is sharp. The control unit 11 may detect the texture area by determining whether or not the texture is strong, based on the distribution of variance of luminance, or the like, in a rectangular area of the input image.

For example, in cases where the change in undulation of luminance distribution in the candidate area for overlaid display has exceeded a predetermined threshold value, the control unit 11 may exclude this area from the overlaid display area. Thus, the control unit 11 may detect, as the overlaid display area, an area where the change in undulation of luminance distribution is equal to or less than the threshold value.

As described above, since the HMD 100 is a see-through eyeglasses type device, basically, the overlay display by the HMD 100 may be realized in a semi-transparent form, in consideration of safety. Therefore, it should avoid displaying overlaid on the areas where texture components are strong, that is, the area where the variance is high.

The non-planar area is an area where the distribution of the three-dimensional geometry is not even. For example, a wall, a floor, mid-air or the like, which is an area of planar geometry, may be suitable for the overlaid display area; because in such an area the overlaid content can be displayed in a shape following the geometry of the real world.

The non-planar area (planar area), as described above, may be detected by passive means of acquisition of depth information by matching a plurality of images, using the stereo image of the cameras 16 and 17, a plurality of frames in time series, or the like; or may be detected by active means of acquisition of depth information by irradiation of IR patterns with an IR sensor, or the like.

For example, in cases where the change in undulation of distribution of three-dimensional geometry in the candidate area for overlaid display has exceeded a predetermined threshold value (different from the threshold value on the texture area), the control unit 11 may exclude this area from the overlaid display area. Thus, the control unit 11 may detect, as the overlaid display area, an area where the change in undulation of distribution of three-dimensional geometry is equal to or less than the threshold value. Then, the control unit 11 determines whether or not there is any overlay-displayable area left, after the above-mentioned determination of the area and the exclusion of the area from the candidate area (Step 37).

If the control unit 11 determines that an overlay-displayable area exists (No), the control unit 11 decides this area as the overlaid display area. On the display unit 18, the control unit 11 generates the content associated to this area, and displays the content to be overlaid on the area (Step 39).

If the control unit 11 determines that there is no overlay-displayable area (Yes), the control unit 11 decides an area other than the candidate area for overlaid display, the area to which the above-mentioned exclusion criteria do not apply, as an overlaid display area (Step 38).

Then the control unit 11 displays the content to be overlaid on this area other than the candidate area (Step 39). In this case, the control unit 11 may provide an indication of an association between areas; for example, by displaying a line drawn up to the overlaid display area from the excluded candidate area, or displaying the content by an idea balloon from the excluded candidate area.

Further, in cases where the overlaid display area other than the candidate area is not found, the control unit 11 may display the content overlaid on the detected texture area or non-planar area, the content being displayed with a lower transparency than usual.

With such criteria as described above, the control unit 11 is able to display various contents in the areas where the visibility by the user may be good and where the user's vision may not be hindered.

[Moving-Object Area Detection Processing]

Figure 4:
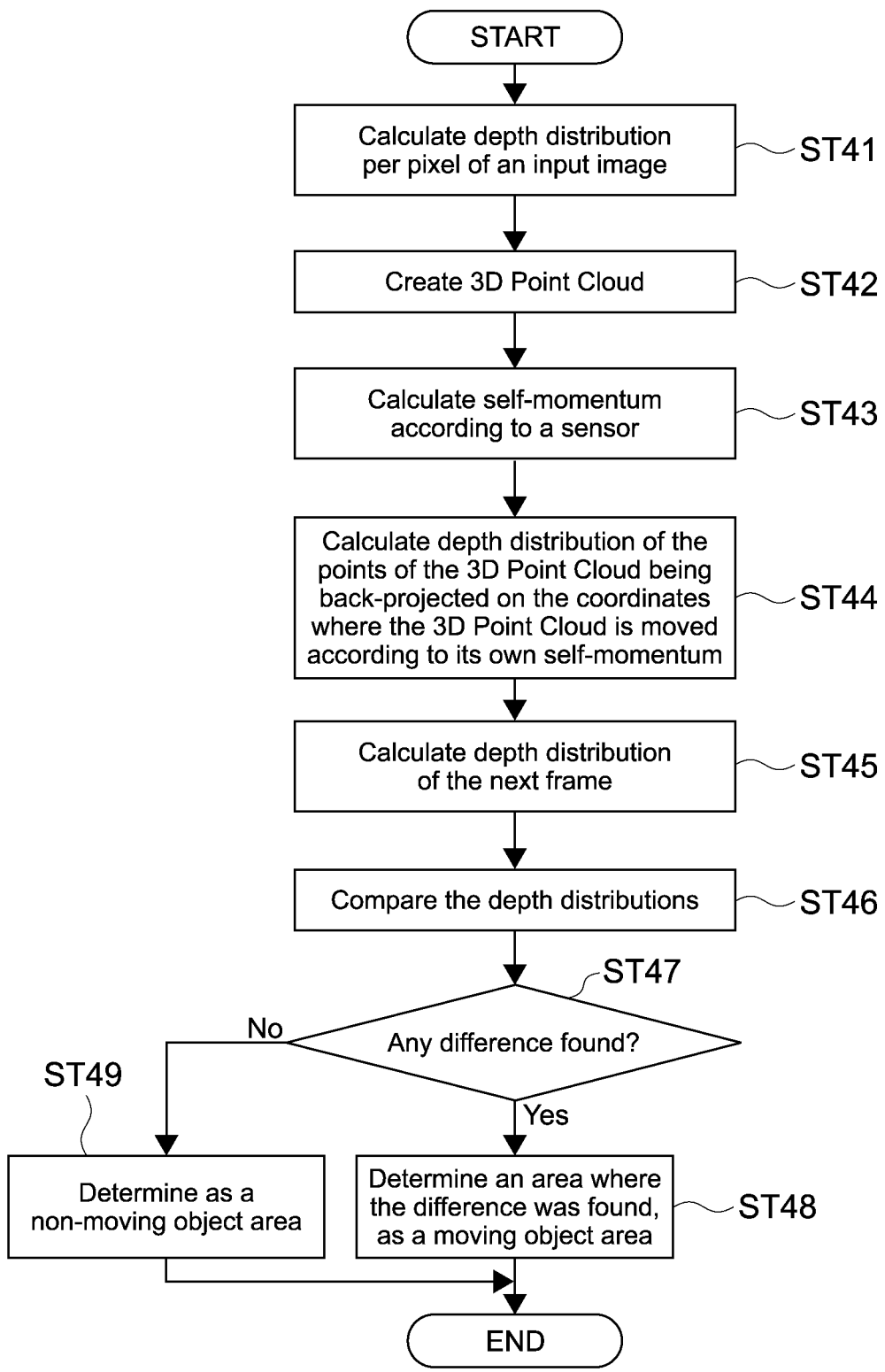
FIG. 4 is a flowchart showing the detailed flow of moving-object area detection processing in the content overlay-display processing of the HMD.

Now, the detail of the process of detection of the moving object area in the above-mentioned content overlay-display processing will be described. FIG. 4 is a flowchart showing the flow of this moving-object area detection processing.

As described above, in this embodiment, the control unit 11 detects the moving object area, taking into account its own movement of the HMD 100 (change in the attitudes of the cameras 16 and 17).

As shown in FIG. 4, first, the control unit 11 performs matching between the images imaged at the same time from a plurality of viewpoints by the cameras 16 and 17; and calculates depth distribution, the depths along Z-axis direction in the real world, per pixel (Step 41). This depth distribution corresponds to a so-called "Depth Map".

In addition, even in cases where there is only one camera; or where only one of the two cameras is used; the control unit 11 may be able to calculate where an object and an area corresponding to each pixel on the camera's image locates on the coordinates of the three-dimensional space of the real world, by performing projection transformation based on intrinsic parameters such as the focal distance of the camera and the size of the sensor and, extrinsic parameters indicating the position and orientation of the camera.

Next, the control unit 11 creates a group of points (3D Point Cloud) representing the pixels of the Depth Map being mapped on the three-dimensional space of the real world (Step 42).

Subsequently, the control unit 11 calculates its self-momentum (amount of change in three-dimensional position and angle) according to various sensor-acquired information of the sensor unit 14 such as the gyro sensor and the acceleration sensor (Step 43). This self-momentum corresponds to a change in the above-mentioned extrinsic parameter of a frame that comes after the frame for which the depth distribution was calculated.

Then the control unit 11 calculates the Depth Map, by back-projecting the 3D Point Cloud obtained from the calculation regarding the previous frame by the above-described method, onto the camera positioned at the position and the angle corresponding to the self-momentum that has been calculated according to the sensor-acquired information (Step 44).

The control unit 11 subsequently calculates the Depth Map for the next frame, using the same method as the above (Step 45). After that, the control unit 11 compares the Depth Map that has been calculated in Step 44 and the Depth Map that has been calculated in Step 45 for each candidate area for overlaid display (Step 46).

If an object in the input image is a rigid body or a stationary object, the difference between the above Depth Maps is supposed to be almost zero. Accordingly, if there is such a difference (Step 47, Yes), the control unit 11 determines an area having such a difference as the moving object area (Step 48). Besides, if there is no difference (Step 47, No), the control unit 11 determines that this candidate area for overlaid display is not the moving object area (Step 49).

Here, the control unit 11 is able to determine whether or not the area is the moving object area, taking into account the difference in luminance as well as the difference in depths. The control unit 11 can go on with the detection of moving object areas in the same way, by sequentially comparing the frames in time series.

As described above, according to this embodiment, the HMD 100 is able to adaptively control the position of the overlaid display, in such a manner that the moving object area, the texture area, and the non-planar area are excluded from the display area, to enhance the visibility.

Modified Examples

The present disclosure is not limited to the embodiment described above and can be variously modified without departing from the gist of the present disclosure. In the embodiment described above, the moving object area, the texture area, and the non-planar area were all excluded from the candidate area for overlaid display. However, the conditions for exclusion may be one or two of those three kinds as well.

For example, with respect to a non-planar area, the HMD 100 may detect its non-planar geometry; modify the shape of the content to follow the non-planar geometry, based on the depth information and the like; and display the modified content to be overlaid on this area.

Further, for example, the HMD 100 may otherwise determine the moving object area as the overlaid display area, from the input image. In this case, the HMD 100 may be configured to determine the moving object area as the overlaid display area only when the user is at rest, in consideration of safety.

In the embodiment described above, the HMD 100 detected whether or not the imaged object was a moving object, taking into account its own movement. However, a possible use case of the eyeglasses-type wearable device such as this HMD 100 may include a mode that the overlaid display is not enabled while the user is moving, in consideration of safety, and that the overlaid display is enabled so as to draw attention and focus by the user only when the user has stopped. In such a case, the HMD 100 may be configured to perform the moving-object area detection processing only in its rest state. As a result, the detection processing can be simplified and the processing load can be reduced.

Specifically, first, the HMD 100 may detect its so-called "rest state" where the self-momentum is substantially zero (the attitude is almost at rest), according to the result of measurement by the gyro sensor, acceleration sensor, and the like. Then, the HMD 100 can regard the image or the area that contains a difference in the luminance, as the moving object area; by finding the difference between the images in time series under the assumption that the HMD 100 itself is in a rest state. In the embodiment described above, the HMD 100 which is a see-through eyeglasses type HMD having a pair of stereo cameras has been described as an example of an application of the present disclosure. However, the present disclosure is not limited to this example.

For example, a retina projector may be employed as a display unit of a similar wearable device. In addition, an image that has been taken by a camera of a smartphone, a tablet, or the like, may be displayed on the display unit; and by further displaying a content overlaid on the image, the same processes as described in the above embodiment may be realized.

[Others]

The present disclosure can have the following configurations.

(1) An information processing apparatus, including:
  an imaging unit;
  a control unit configured to
    detect at least one candidate area for overlaid display of a content, from an image imaged by the imaging unit,
    detect as an overlaid display area, out of the at least one candidate area, an area where a change in undulation of luminance distribution is equal to or less than a first threshold value, and
    generate the content to be arranged virtually in a visually recognizable manner on the overlaid display area, to be recognized by a user; and
  an output unit configured to output the generated content overlaid on the overlaid display area.

(2) The information processing apparatus according to (1), in which
  the control unit detects as the overlaid display area, out of the at least one candidate area, an area where a change in undulation of three-dimensional geometry is equal to or less than a second threshold.

(3) The information processing apparatus according to (1), in which
  the control unit detects whether or not each of the at least one candidate area is a moving object area, and excludes the moving object area from the overlaid display area.

(4) The information processing apparatus according to (3), further including:
  a sensor configured to detect an attitude of the information processing apparatus;
  the control unit being further configured to
    detect a change in the attitude that has been detected by the sensor, and
    detect the moving object area by subtracting the change in the attitude, from the input image.

(5) The information processing apparatus according to (4), in which
  the control unit detects presence or absence of the moving object area by
    calculating first and second depth distributions, respectively from consecutive first and second images out of the input image,
    calculating a third depth distribution by reflecting on the first depth distribution the change in the attitude being detected with respect to a time interval between the first and second images, and
    detecting presence or absence of any difference between the second and third depth distributions.

(6) The information processing apparatus according to (3), further including:
  a sensor configured to detect an attitude of the information processing apparatus;
  the control unit being further configured to, determine whether or not the information processing apparatus is at rest, and if the information processing apparatus is at rest, detect the moving object area by extracting the difference between the consequent images having been input.

(7) The information processing apparatus according to (1), in which
  the output unit outputs the generated content in a semi-transparent state overlaid on the overlaid display area, and
  the control unit controls the output unit to is configured to, if the candidate area with the change in undulation of luminance distribution being equal to or less than the first threshold value is not detected, overlay the generated content at a decreased transparency that is lower than a transparency of the semi-transparent state.

(8) The information processing apparatus according to (1), in which
  the control unit is configured to, if the candidate area with the change in undulation of luminance distribution being equal to or less than the first threshold value is not detected, control the output unit to display the content on an area other than the candidate area, with an indication of an association between the content and a candidate area where the change in undulation of luminance distribution is greater than the first threshold.

(9) The information processing apparatus according to (1), in which
  the control unit detects a moving object area out of the at least one candidate area, as the overlaid display area.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
  an imaging unit;
  a central processing unit (CPU) configured to:
    detect at least one candidate area for overlaid display of a content, from an image imaged by the imaging unit;
    detect as an overlaid display area, out of the at least one candidate area, an area where a change in undulation of luminance distribution is equal to or less than a first threshold value; and
    generate the content to be arranged virtually in a visually recognizable manner on the overlaid display area, to be recognized by a user; and
  a display screen configured to display the generated content overlaid on the overlaid display area.

2. The information processing apparatus according to claim 1, wherein the CPU is configured to detect as the overlaid display area, out of the at least one candidate area, an area where a change in undulation of three-dimensional geometry is equal to or less than a second threshold.

3. The information processing apparatus according to claim 1, wherein the CPU is configured to:
  detect whether each of the at least one candidate area is a moving object area; and
  exclude the moving object area from the overlaid display area.

4. The information processing apparatus according to claim 3, further comprising
   a sensor configured to detect an attitude of the information processing apparatus;
   wherein the CPU is further configured to:
      detect a change in the attitude that has been detected by the sensor; and
      detect the moving object area based on subtraction of the change in the attitude from the image.

5. The information processing apparatus according to claim 4, wherein
   the CPU is configured to detect presence or absence of the moving object area based on calculation of first and second depth distributions, respectively from consecutive first and second images out of the image,
      calculation of a third depth distribution based on reflection of the change in the attitude detected with respect to a time interval between the first and second images on the first depth distribution, and
      detection of presence or absence of any difference between the second and third depth distributions.

6. The information processing apparatus according to claim 3, further comprising
   a sensor configured to detect an attitude of the information processing apparatus;
   wherein the CPU is further configured to:
      determine whether the information processing apparatus is at rest; and
      in an event the information processing apparatus is at rest, detect the moving object area based on extraction of a difference between consequent images that are input.

7. The information processing apparatus according to claim 1, wherein
   the display screen is configured to display the generated content in a semi-transparent state overlaid on the overlaid display area, and
   the CPU is configured to control the display screen to, in an event the at least one candidate area with the change in undulation of luminance distribution equal to or less than the first threshold value undetected, overlay the generated content at a decreased transparency that is lower than a transparency of the semi-transparent state.

8. The information processing apparatus according to claim 1, wherein
   the CPU is configured to, in an event the at least one candidate area with the change in undulation of luminance distribution equal to or less than the first threshold value is undetected, control the display screen to display the content on an area other than the at least one candidate area, with an indication of an association between the content and a candidate area where the change in undulation of luminance distribution is greater than the first threshold.

9. The information processing apparatus according to claim 1, wherein the CPU is configured to detect a moving object area out of the at least one candidate area, as the overlaid display area.

10. An information processing method, comprising:
   detecting at least one candidate area for overlaid display of a content, from an image imaged by an imaging unit;
   detecting as an overlaid display area, out of the at least one candidate area, an area where a change in undulation of luminance distribution is equal to or less than a first threshold value;
   generating the content to be arranged virtually in a visually recognizable manner on the overlaid display area, to be recognized by a user; and
   outputting the generated content overlaid on the overlaid display area.

11. A non-transitory computer-readable medium having stored thereon, a set of computer-executable instructions, for causing an information processing apparatus to execute an operation, comprising:
   detecting at least one candidate area for overlaid display of a content, from an image imaged by an imaging unit;
   detecting as an overlaid display area, out of the at least one candidate area, an area where a change in undulation of luminance distribution is equal to or less than a first threshold value;
   generating the content to be arranged virtually in a visually recognizable manner on the overlaid display area, to be recognized by a user; and
   outputting the generated content overlaid on the overlaid display area.

* * * * *